Sept. 18, 1934.  C. S. NELSON  1,974,343
CREAM EXTRACTOR
Filed April 22, 1933
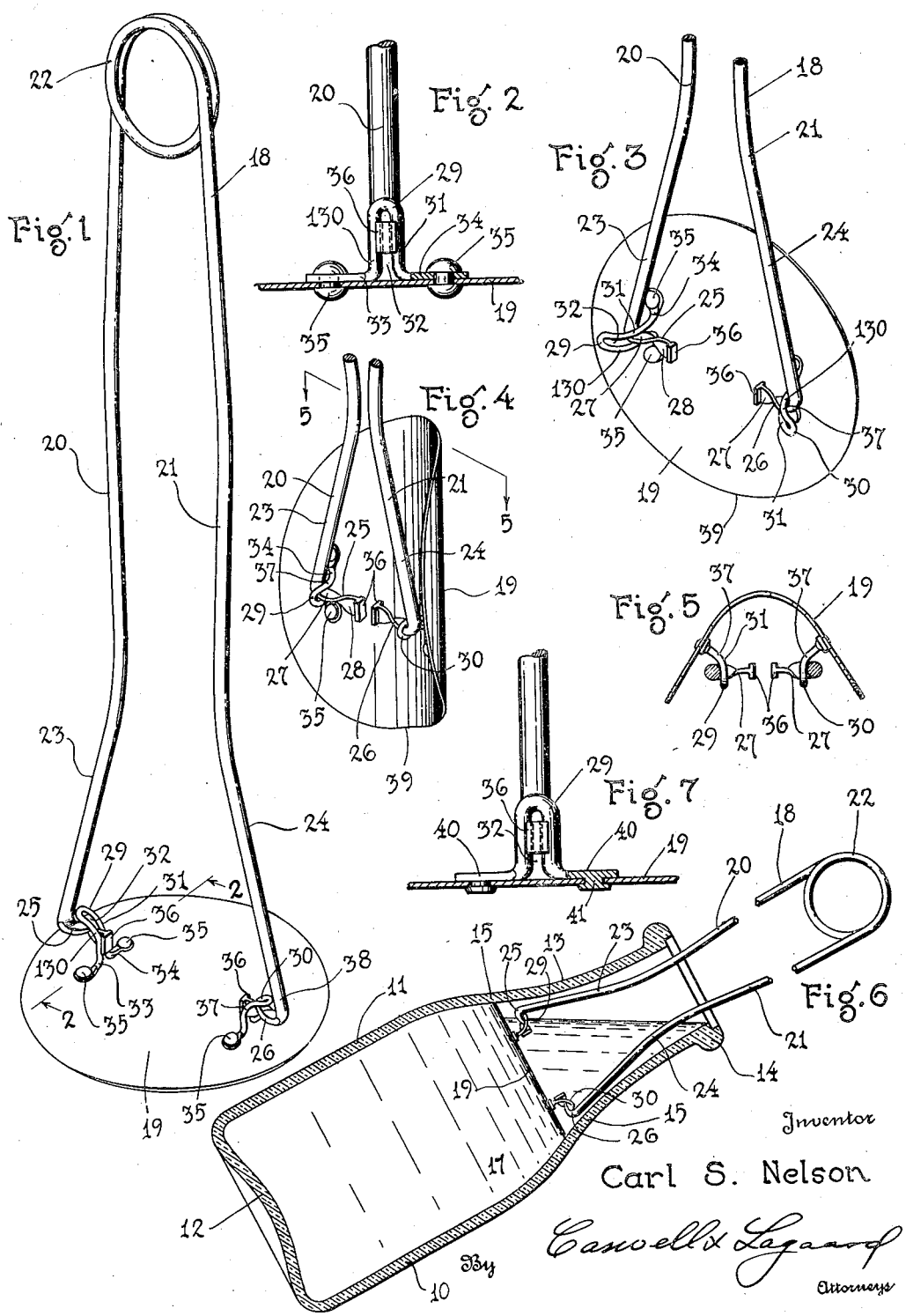
Inventor
Carl S. Nelson
By Caswell & Lagaard
Attorneys Patented Sept. 18, 1934

1,974,343

UNITED STATES PATENT OFFICE 1,974,343

CREAM EXTRACTOR

Carl S. Nelson, Minneapolis, Minn.

Application April 22, 1933, Serial No. 667,354

12 Claims. (Cl. 210—51.5)

My invention relates to cream extractors and has for its object to provide a cream extractor including a disk-like stopper formed of resilient material and adapted to extend across the neck of a milk bottle at the cream line thereof and a handle having spaced arms issuing outwardly from said stopper in substantially the same direction for holding said stopper in position and for manipulating the same.

Another object of the invention resides in providing a cream extractor in which the stopper is rotated from a position at right angles to the direction of extent of the handle to a position substantially parallel to the plane of extent of the handle when the arms of the handle are moved toward one another.

A still further object of the invention resides in providing a cream extractor in which flexing of the disk-like stopper is procured through movement of the arms of the handle toward one another.

Another object of the invention resides in providing a cream extractor in which rotation of the disk is first procured through movement of the arms toward one another and flexing of the disk subsequently procured through continuation of the same movement of the arms.

A feature of the invention resides in constructing one of the arms with a trunnion and in constructing the disk with a bearing along which said trunnion may rotate and slide and in further constructing one thereof with a spiralling cam surface adapted to engage a portion of the other to procure rotational movement of the disk with respect to the handle through longitudinal relative movement of the trunnion and bearing.

A still further object of the invention resides in constructing the bearing in the form of a loop having spaced reaches providing a slot along which the trunnion slides and in constructing the trunnion with a twisted flattened portion movable longitudinally and simultaneously rotatable in said slot.

A feature of the invention resides in constructing said loop in curved formation so as to permit of bringing the arms together after the stopper has reached its final position to procure flexing of the stopper.

Other objects of the invention reside in the novel combination and arrangement of parts and in the details of construction hereinafter illustrated and/or described.

In the drawing:

Fig. 1 is a perspective view of a cream extractor illustrating an embodiment of my invention and showing the parts arranged in normal position.

Fig. 2 is a longitudinal sectional view of a portion of the device shown in Fig. 1 taken on line 2—2 of Fig. 1.

Fig. 3 is a perspective view of the invention showing the stopper turned to a position parallel to the direction of extent of the handle.

Fig. 4 is a view similar to Fig. 3 showing the stopper flexed.

Fig. 5 is a plan sectional view taken on line 5—5 of Fig. 4.

Fig. 6 is a longitudinal sectional view of a milk bottle showing the application of my invention thereto.

Fig. 7 is a view similar to Fig. 2 showing a modification of the invention.

In the removal of cream from milk bottles, considerable inconvenience has heretofore been encountered in that a considerable portion of the milk also flows out with the cream when cream is poured off from the top of the bottle in the usual manner. The present invention provides a device whereby a stopper may be inserted by simple manipulation into the milk bottle through the neck thereof without appreciably disturbing the cream and brought into a position to close the milk bottle at the cream line whereby the cream may be conveniently poured off from the milk bottle.

For the purpose of illustrating my invention, I have shown in Fig. 6 an ordinary milk bottle 10 which consists of a body portion 11 having a bottom 12 and a neck 13 connected therewith. Neck 13 terminates in a rim 14 in which may be attached the usual milk bottle cap, not shown. The neck 13 is considerably smaller in diameter than the body 11 and is formed with a converging wall 15 extending from the body 11 up to the rim 14. When the bottle is filled with milk and the cream allowed to settle to the top, the cream line in the bottle usually occurs at about the elevation indicated by the reference character 17.

My invention proper comprises a handle indicated in its entirety at 18 which carries a disk-like stopper 19 adapted to be inserted within the neck 13 at the locality 17 and to be drawn upwardly against the inclined wall 15. The stopper 19 may be manipulated by the handle 18 and is adapted to be brought into a position permitting of insertion of the same into the milk bottle and the subsequent rearrangement of the same to close the neck of the milk bottle and permit of withdrawing the cream without the flow of milk from the bottle.

The handle 18 may be constructed of wire and when so formed is constructed from a single piece of wire bent to provide two arms 20 and 21. These arms are connected together through a coil 22 consisting of one or more convolutions of the wire. The handle is preferably constructed of a somewhat resilient material so that the two arms 20 and 21 are normally spread apart and may be brought together against the action of the coil 22 which serves as a spiral spring for resisting movement of the arms toward one another. Arms 20 and 21 flare outwardly near their ends as indicated at 23 and 24 and terminate at their ends in trunnions 25 and 26 which are bent toward one another. The two trunnions 25 and 26 are constructed by flattening the ends of the wire from which the handle is made and by giving each flattened portion a quarter of a twist. It will be noted in Fig. 4 that the parts 27 of the trunnions 25 and 26 adjacent the arms 20 and 21 extend at right angles to said arms while the parts 28 of said trunnions near the ends thereof lie in a plane containing said arms.

The stopper 19 may be constructed of a thin sheet of spring material such as spring steel, phosphor bronze, or the like, or the same may be constructed of rubber, celluloid or other similar material. Disk 19 is preferably of sufficient thinness to permit of readily flexing the same as shown in Fig. 5 to permit of inserting the stopper into the interior of the milk bottle through the neck thereof. When the pressure tending to so flex the stopper is relieved, the same immediately springs back into normal position in which it will extend directly across the neck of the milk bottle and close the same to prevent the flow of milk out of the bottle proper.

For cooperation with the trunnions 25 and 26 of handle 18 the two loops 29 and 30 are employed which are best shown in Figs. 1 and 2. These loops are constructed of wire and are each bent to provide two spaced reaches 130 and 31 forming a slot 32 therebetween. The ends 33 and 34 of these reaches are constructed to form eyes and are attached to the stopper 19 through rivets 35 which extend jointly through said eyes and the stopper proper. The trunnions 25 and 26 are received within the slot 32 of the two loops 29 and 30 and may slide through the same. As the said trunnions slide in these slots rotational movement of the disk 19 is procured which causes the said disk to turn from its normal position as shown in Fig. 1 in which the same extends at right angles to the direction of extent of the handle 18 to a position parallel to the direction of extent of said handle as shown in Fig. 3. The two loops 29 and 30 thus serves as bearings for the trunnions 25 and 26 which both slide and rotate with respect thereto.

For the purpose of preventing the trunnions 25 and 26 from becoming disengaged from the slots 32 of the loops 29 and 30, the ends of each of said trunnions are provided with heads 36 which engage the reaches 130 and 31 of said trunnions and hold the parts properly assembled.

In the manipulation of the cream extractor the arms 20 and 21 of handle 18 are brought together which causes rotation of the stopper 19 to the position shown in Fig. 3. Further movement of the arms 20 and 21 of handle 18 together causes the flexing of the stopper proper as shown in Figs. 4 and 5. This is accomplished through the disposition of the slots 32 of loops 29 and 30 which serve as bearings and which are disposed outwardly beyond the plane of the disk proper. To facilitate the flexing of the disk to the desired degree, the said reaches of the loops 29 and 30 are bent outwardly from one another in curved fashion, as designated at 37, in Fig. 1. This permits of engagement of the shanks 38 on the ends of the arms 20 and 21 adjacent trunnions 25 and 26 to engage the reaches of said loops and to force the same toward one another and procure flexing of the stopper. By curving the said reaches, the shanks engage the said loops in a manner to more readily procure flexing and to prevent binding of the parts during movement thereof.

The use of the invention is as follows: Through the action of coil 22 the parts are normally held as shown in Fig. 1. When it is desired to extract the cream from a milk bottle, the paper cap closing the open neck of the bottle is removed. The handle 18 is then grasped and the two arms 20 and 21 brought together. This causes the turning of the stopper and the subsequent flexing of the same. When the parts become arranged as shown in Fig. 4, the stopper may be inserted into the neck of the bottle. Due to the curvature of the stopper and the thickness of the material from which the same is constructed, a sharp lower edge 39 is formed on said stopper which severs the upper surface of the cream from the bottle and permits of inserting the stopper into the cream without disturbing the cream. The stopper is then lowered into the milk bottle to a depth below the cream level indicated at 17. The two arms 20 and 21 of the handle are next released. The coil 22 causes these arms to spread outwardly and the trunnions 25 and 26 slide in the slots 32 of loops 29 and 30 procuring rotational movement of the stopper 19 so that the same is caused to extend in a direction at right angles to the direction of extent of the handle 18. Handle 18 may then be drawn outwardly along the neck of the bottle to bring the stopper 19 against the inner surface of the converging wall 15 of said neck. This closes off the neck and prevents the flow of milk past the stopper. While the cream extractor is so held, the bottle 10 may be tilted to the position shown in Fig. 6, in which the cream disposed above the stopper 19 will flow out of the same. After all of the cream has been removed, stopper 19 is lowered and the arms 20 and 21 of handle 18 brought together to bring the parts to the positions shown in Fig. 4. Thereafter the cream extractor may be withdrawn from the bottle in the opposite manner from which it was inserted.

In Fig. 7 I have shown a slight modification of the invention. In this form of the invention similar reference characters have been used to designate parts identical with those of the other form of the invention and such parts will not be again described in detail. In this form of the invention the loops 29 and 30 are constructed with base portions 40 instead of being provided with eyes, as previously described. These base portions are formed by pressing the ends of said loops in suitable dies. In the construction of the base portions 40, projections 41 are formed on the under side of said bases which project outwardly therefrom and which serve as rivets adapted to be riveted to the under side of the stopper 19 to hold the loops 29 and 30 attached thereto.

The advantages of my invention are manifest. An extremely simple and practical device is provided whereby cream may be readily and effectively separated from the milk contained within the milk bottle and completely removed therefrom. The device is inserted into the milk bottle without appreciably disturbing the cream so that loss of cream by mixing with the milk is entirely prevented. The device is operated by simple manipulation through the pressing of the spring controlled arms of the handle together. A single movement procures both turning of the stopper and flexing of the same so that no appreciable amount of work is necessary in operating the device. My invention is positive in action and may be constructed in a manner to procure a rigid and substantial construction. My invention is readily cleaned and is extremely sanitary, there being no tubular sliding parts in which cream may be lodged.

Changes in the specific form of my invention, as herein disclosed, may be made within the scope of what is claimed without departing from the spirit of my invention.

Having described my invention, what I claim as new and desire to protect by Letters Patent is:

1. In a cream extractor, a disk-like stopper, a handle having spaced arms issuing outwardly from said stopper in substantially the same direction, means extending between said arms and disposed outwardly from said stopper for supporting said arms for movement toward and from each other, means operable throughout the initial movement of said arms for swinging said stopper from a position substantially at right angles to the extent of said arms to a position substantially parallel thereto, and means operable throughout the remainder of the movement of said arms for flexing said stopper to cause the same to enter the neck of the milk bottle.

2. In a cream extractor, a disk-like stopper, a handle having spaced arms issuing outwardly from said stopper in substantially the same direction, means extending between said arms and disposed outwardly from said stopper for supporting said arms for movement toward and from each other, a member on said stopper, a member on the end of one of said arms, a cam on one of said members engaging the other member and operating upon movement of said arms toward and from each other to swing said stopper from a position substantially at right angles to the direction of extent of said arms to a position parallel therewith.

3. In a cream extractor, a disk-like stopper, a handle having spaced arms issuing outwardly from said stopper, means extending between said arms and disposed outwardly from said stopper for supporting said arms for movement toward and from each other, a trunnion on the end of one of said arms, a bearing on said stopper for said trunnion, one thereof having a surface spiralling with respect to the axis of said trunnion, and adapted upon movement of said arms toward one another to shift said trunnion along said bearing and to procure rotational movement of said stopper.

4. In a cream extractor, a disk-like stopper, formed of resilient material, a handle having spaced arms issuing outwardly from said stopper, means extending between said arms and disposed outwardly from said stopper for supporting said arms for movement toward and from each other, a pair of loops extending outwardly from said stopper on the same side thereof, and members on the ends of said arms for engagement with said loops, said members causing flexing of the stopper upon movement of the arms toward one another.

5. In a cream extractor, a disk-like stopper, a handle having spaced arms issuing outwardly from said stopper, means extending between said arms and disposed outwardly from said stopper for supporting said arms for movement toward and from each other, a trunnion, a bearing for said trunnion, one thereof being attached to the disk and the other thereof being attached to one of said arms, and means operating between said bearing and trunnion for procuring rotational movement of said disk with respect to said arms upon longitudinal movement of said trunnion, and means operable through movement of said arms toward and from each other for causing relative longitudinal movement of said trunnion and bearing.

6. In a cream extractor, a disk-like stopper, formed of resilient material, a handle having spaced arms issuing outwardly from said stopper, means extending between said arms and disposed outwardly from said stopper for supporting said arms for movement toward and from each other, a trunnion on the end of one of said arms, said trunnion having a twisted surface, and a bearing on said disk receiving said trunnion, said bearing having a surface contacting with the twisted surface of said trunnion, and means for pivotally connecting the other arm to said disk.

7. In a cream extractor, a disk-like stopper, a handle having spaced arms issuing outwardly from said stopper in substantially the same direction, means extending between said arms and disposed outwardly from said stopper for supporting said arms for movement toward and from each other, a loop extending outwardly from said disk and having spaced reaches to provide a slot therebetween, means on the end of one of said arms having a spiralling portion for disposition within said slot for procuring rotational movement of said disk upon movement of said portion through said slot, and means on the other of said arms for engagement with said disk, both of said means cooperating to procure movement of the said first named means through said slot upon movement of the arms toward and from one another.

8. In a cream extractor, a disk-like stopper, a handle having spaced arms issuing outwardly from said stopper, means extending between said arms and disposed outwardly from said stopper for supporting said arms for movement toward and from each other, a loop extending outwardly from said disk and having spaced reaches to provide a slot therebetween, a trunnion on the end of one of said arms of substantially rectangular cross section and formed with a longitudinally extending twist, said trunnion being movable within said slot to procure rotational movement of said disk, means on the end of the other of said arms for engagement with said disk, said trunnion and last named means cooperating to procure longitudinal movement of said trunnion through said slot upon movement of said arms toward and from each other.

9. In a cream extractor, a disk-like stopper, a handle having spaced arms issuing outwardly from said stopper, means extending between said arms and disposed outwardly from said stopper for supporting said arms for movement toward and from each other, a loop extending outwardly from said disk and having spaced reaches to provide a slot therebetween, a trunnion having a twisted flattened portion issuing outwardly from one of said arms and movable within said slot, means on the other arm for engagement with said disk to procure longitudinal movement of said trunnion with respect to said loop to cause the disk to rotate upon movement of the arm toward and from one another, said trunnion moving in one part of said slot during the rotation of said disk and moving from said part of the slot to another part of the slot during subsequent movement of said arm toward one another to cause the disk to flex.

10. In a cream extractor, a flexible disc-like stopper, two spaced arms issuing outwardly from said stopper in substantially the same direction, means extending between said arms and disposed outwardly from said stopper for supporting said arms for movement toward and from each other, pivotal means including a cam for connecting one arm to said stopper, pivotal means for connecting the other arm to said stopper, said pivotal means serving to flex the stopper upon movement of the arms toward one another, and means cooperating with said cam for rotating said stopper upon movement of the arms toward one another.

11. In a cream separator, a flexible disc-like stopper, two arms issuing outwardly from said stopper and forming a handle, means for guiding said arms for lateral movement toward and from one another, and means including a cam operated by lateral movement of said arms for rotating said stopper.

12. In a cream separator, a flexible disc-like stopper, two arms issuing outwardly from said stopper and forming a handle, means for guiding said arms for lateral movement toward and from one another, connecting means between one of said arms and said stopper, said connecting means including a member having a helical surface and a member having a part coacting with said helical surface, and connecting means between said stopper and the other arm, said members operating upon lateral movement of the arms to rotate said stopper.

CARL S. NELSON.